United States Patent [19]
Dehlen

[11] 3,981,117
[45] Sept. 21, 1976

[54] LINING AND FASTENER ARRANGEMENT FOR DEVICES HAVING SURFACES SUBJECT TO WEAR

[75] Inventor: Bengt Lars Arne Dehlen, Trelleborg, Sweden

[73] Assignee: Trelleborgs Gummifabrik Aktiebolag, Trelleborg, Sweden

[22] Filed: May 6, 1975

[21] Appl. No.: 574,994

[30] Foreign Application Priority Data
  May 7, 1974  Sweden .............................. 7406072

[52] U.S. Cl. ................................... 52/509; 52/269
[51] Int. Cl.² .......................................... E04B 1/38
[58] Field of Search .............. 52/512, 506, 704–711, 52/509, 622, 269

[56] References Cited
UNITED STATES PATENTS

| | | |
|---|---|---|
| 2,889,017 | 6/1959 | Eckel ................................... 52/512 |
| 3,157,942 | 11/1964 | MacLean, Jr. .................... 52/506 X |
| 3,350,832 | 11/1967 | Persson ............................. 52/506 X |
| 3,742,670 | 7/1973 | Byrd, Jr. ............................... 52/506 |

*Primary Examiner*—Ernest R. Purser
*Assistant Examiner*—Carl D. Friedman
*Attorney, Agent, or Firm*—Beveridge, DeGrandi, Kline & Lunsford

[57] ABSTRACT

A lining and fastener arrangement with liner elements clamped by means of fasteners to a wall subject to wear. The liner elements comprise an elastomer layer and have a reinforcing metal sheet at least at their edges. The fasteners have at least one knife edge which has cut through the elastomer layer and is pressed against the reinforcing metal sheet for clamping the liner elements against the wall.

6 Claims, 7 Drawing Figures

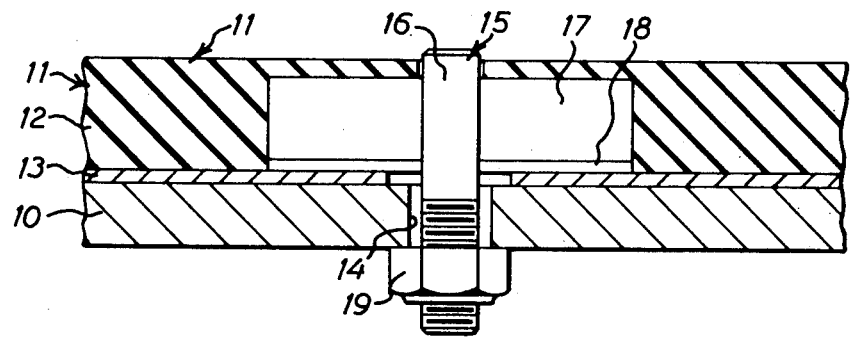
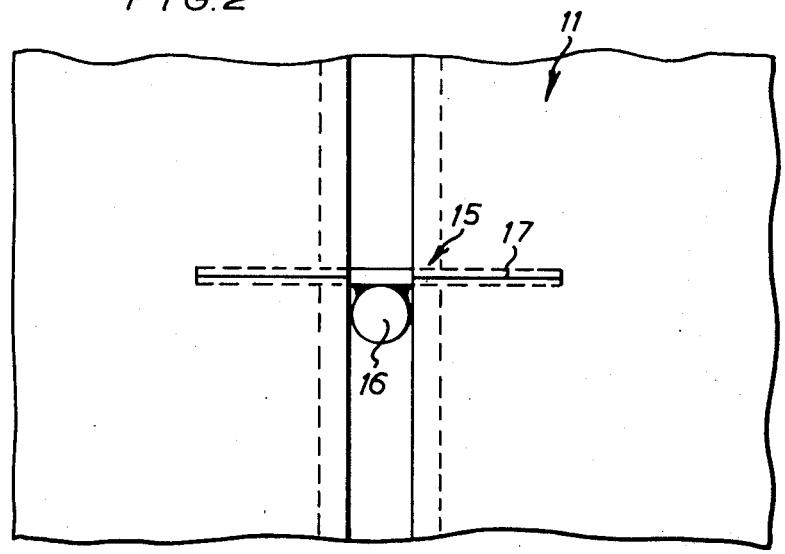

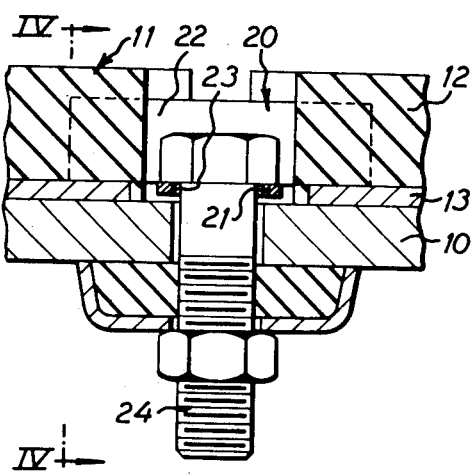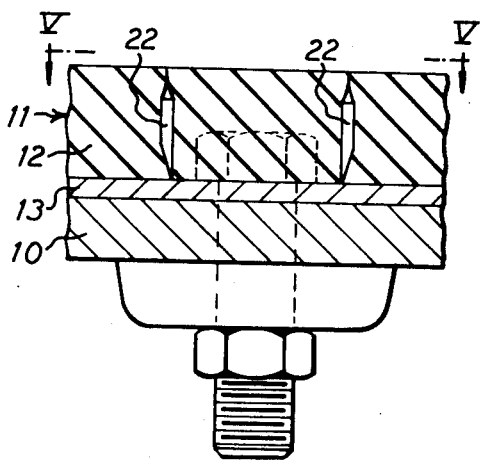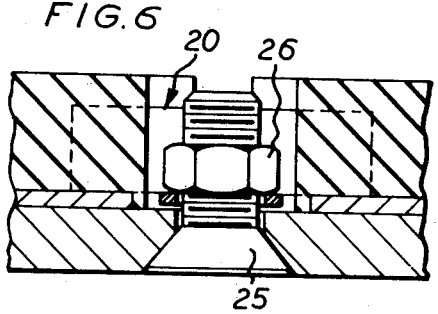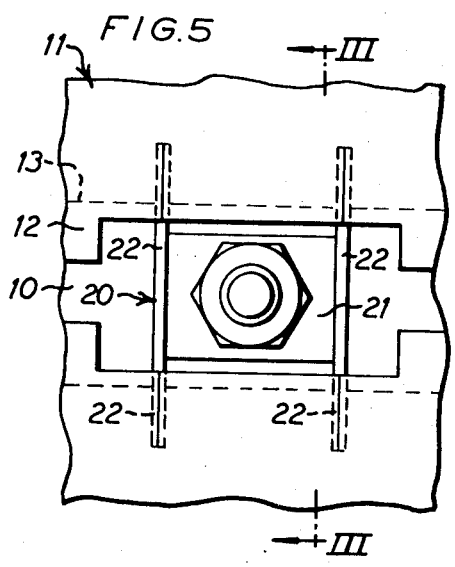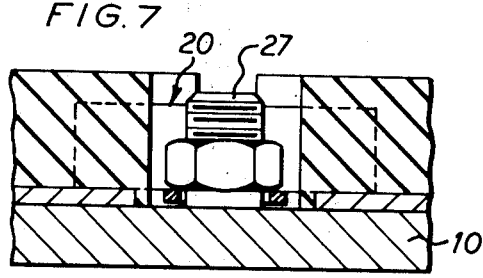

LINING AND FASTENER ARRANGEMENT FOR DEVICES HAVING SURFACES SUBJECT TO WEAR

Concrete mixers, mill drums, chutes, channels and other walls having surfaces which are subject to wear are often lined with a wear-resistant liner of elastomer material. These wear-resistant liners are anchored to the wall surface subject to wear, usually by screwing, clamping, adhesively bonding, or vulcanization. However, these previously known anchoring methods are circumstantial and costly.

The object of the present invention therefore is to provide an easily mounted and cost-saving retaining arrangement for lining elements to be attached to a surface subject to wear.

To this end, the invention comprises an arrangement in such a wall which on its surface subject to wear has adjoining lining elements which comprise an elastomer layer having a reinforcement formed by metal sheeting at least at the edges of each lining element, said lining elements being anchored to the surface subject to wear by fastener means.

According to the invention, each fastener means includes a fastening element which has at least one knife edge and is placed adjacent the edge of a lining element or in the joint between two adjoining lining elements and which by means of its knife edge or knife edges has cut through the elastomer material of the lining element or elements to the reinforcing metal sheet itself in order to be pressed against said metal sheet and to press, by the intermediary of said metal sheet, the lining element or elements against the wall. It is of particular advantage if the fastening element consists of metal sheet material bent into U-shape and has a central portion with knife edges protruding on either side of said central portion which is either connected to a protruding stud bolt or has a through hole for a clamping bolt. The fastening element can also be a sheet metal strip provided with a knife edge and fixed near one end of a stud bolt. Another possibility is to have a fastening element in the form of a nut to which at least one knife edge is secured.

The arrangement according to the present invention possesses great advantages as compared with previously known systems and arrangements for the fastening of wear liners to walls having surfaces subjected to wear. Thus it is not necessary to bore fastening holes in the lining elements, and mounting is considerably more rapid and simple as no matching problems exist. Another essential advantage is that the number of fastening bolts will be half the usual number, since the fastening bolts can be placed in the joint between two lining elements so that each bolt serves as an anchorage for two lining elements. A further advantage is that holes need not necessarily be bored in the wall having the surface subjected to wear, if the material of said wall is metal. Thus in the case of an unbored mixer drum or an unbored metal base, stud bolts can be fastened simply by stud welding, whereafter the fastening element in the form of a washer is passed onto said stud bolts to be tightened against the base with the aid of a nut so that the knife edges cut through the elastomer portions of the lining elements and are pressed against the reinforcing metal sheet in said lining elements.

The invention will be more fully described hereinbelow and with reference to the accompanying drawings in which:

FIGS. 1 and 2 show one embodiment of the invention in cross section and plan view, respectively;

FIG. 3 shows a second embodiment of the invention in a cross-section taken on the line III—III in FIG. 5;

FIG. 4 shows a section taken on the line IV—IV in FIG. 3;

FIG. 5 shows a plan view taken on the line V—V in FIG. 4;

FIG. 6 shows a section, corresponding to FIG. 3, of a third embodiment of the invention; and FIG. 7 in a corresponding manner shows a section of a fourth embodiment of the invention.

A wall 10 of metal material is shown in FIG. 1. Said wall may be for example the wall of a concrete mixer, mill drum or chute. Lining elements 11 have been clamped against the wall 10. Said lining elements have an elastomer portion 12 and a reinforcing metal sheet 13 attached to the underside of the portion 12 by vulcanizing or adhesive bonding. In the joint between two adjoining lining elements 11 the wall 10 has a through hole 14 through which a fastening element 15 has been passed. In this embodiment the fastening element 15 is a stud bolt 16 having a sheet metal strip 17 welded to one of its ends. At the downwardly directed edge (see FIG. 1) the sheet metal strip 17 has a knife edge 18. When the lining elements 11 are mounted the fastening element 15 is hammered down in the joint between the lining elements so that the knife edge 18 cuts through the elastomer material from the outer surface of the two lining elements 11 and penetrates to the reinforcing metal sheet 13 against which the sheet metal strip 17 is then clamped by means of a nut 19 which is screwed onto the stud bolt 16.

In the embodiment shown in FIGS. 3–5, the fastening element is in the shape of a sheet metal member 20 bent into U-shape. As will best be seen from FIG. 5, said sheet metal member has a central portion 21 and on either side thereof protruding knife edges 22. In the present instance the central portion has a through hole 23 for passing a fastening bolt 24 therethrough. Same as in the embodiment according to FIGS. 1 and 2, the fastening member 20 has been placed in the joint between two adjoining lining elements 11 and hammered down into the elastomer material 12 in such a manner that the knife edges 22 have cut through said material and are pressed against the reinforcing metal sheets 13.

The embodiment illustrated in FIG. 6 utilizes the same type of U-shaped fastening member 20. However, instead of a bolt 24, use is made of a screw 25 which coacts with a nut 26 placed between the lining elements 11.

FIG. 7 shows a further embodiment in which the fastening member 20 coacts with a stud bolt 27 attached by stud welding to the inner side of the wall 10.

The fastening means in the arrangement according to the invention might also be a nut to which at least one knife edge has been welded. Said knife edge will cut through the elastomer material when the nut is drawn into the gap between two adjoining liner elements with the aid of a stud.

In the embodiment of the invention described above the fastener arrangement has been employed for such elastomer liners which have a stiffening metal sheet vulcanized to their rear face. However, the fastener arrangement can also be used for elastomer liners of the type in which the reinforcing metal sheet constitutes a reinforcement embedded in the elastomer material and is a perforated metal sheet or an expanded metal sheet.

What I claim and desire to secure by Letters Patent is:

1. A wear surface lining and anchoring means comprising a lining element including a layer of wear resistance elastomer material having metal sheet reinforcing at least along its edge portions, said metal sheet reinforcing being spaced from one surface of said layer of elastomer material, fastening means for mounting said lining element onto a wall subject to wear with the surface of said lining element opposite said one surface adjacent said wall, said fastening means including a clamping member for engaging and clamping and lining element against said wall, means on said clamping member defining an elongated knife-edge directed toward metal reinforcing sheet and cutting through said wear resistant elastomer material from said one surface and engaging said metal reinforcing sheet, and connector means engaging said wall and retaining said clamping member in position to retain said lining element rigidly clamped on the wall by clamping action between said metal reinforcing sheet and said knife edge.

2. The arrangement of claim 1 wherein said clamping member consist of sheet metal material bent into U-shape and have a central portion with said knife edges protruding on either side thereof.

3. Structure defined in claim 2 wherein said connector means comprises a stud bolt protruding from said wall.

4. The arrangement of claim 2 wherein the central portion of said clamping means defines a through hole for a threaded fastener element.

5. The arrangement of claim 1 wherein said clamping member consists of a sheet metal strip having a knife edge and fixedly attached to one end of a stud bolt.

6. The arrangement of claim 1 wherein said clamping member consists of a nut with at least one knife edge forming part attached thereto.

* * * * *